(12) United States Patent
Hsieh

(10) Patent No.: US 6,433,678 B1
(45) Date of Patent: Aug. 13, 2002

(54) VEHICLE BURGLAR ALARM LOCK

(76) Inventor: Chen-Kuei Hsieh, No. 29, Lane 488, Section 2, Shing-Ren Road, Chung-Li City (TW)

( * ) Notice: Subject to any disclaimer, the term of this patent is extended or adjusted under 35 U.S.C. 154(b) by 0 days.

(21) Appl. No.: 09/908,077

(22) Filed: Jul. 17, 2001

(51) Int. Cl.[7] .............................................. B60R 25/10
(52) U.S. Cl. .................... 340/426; 340/425.5; 340/428; 340/544; 70/57.1
(58) Field of Search ................................. 340/594, 426, 340/425.5, 429, 544, 542, 428; 70/57, 57.1, 207, 209, 210, 226, 237; 370/10.2

(56) References Cited

U.S. PATENT DOCUMENTS

| | | | | |
|---|---|---|---|---|
| 5,055,823 A | * | 10/1991 | Fuller | 340/426 |
| 5,128,649 A | * | 7/1992 | Elmer | 340/426 |
| 5,398,017 A | * | 3/1995 | Chen | 340/426 |
| 5,469,135 A | * | 11/1995 | Solow | 340/426 |
| 5,598,725 A | * | 2/1997 | Chang | 70/209 |
| 5,801,617 A | * | 9/1998 | Langner et al. | 340/426 |
| 5,920,254 A | * | 7/1999 | Hsieh | 340/426 |

* cited by examiner

Primary Examiner—Daniel J. Wu
Assistant Examiner—Son Tang
(74) Attorney, Agent, or Firm—Pro-Techtor International Services

(57) ABSTRACT

A vehicle burglar alarm lock has a body capable of being locked to an annular handle of a steering wheel. An alarming circuit in the body is capable of being actuated for operation. The alarming circuit has an independent battery set not being connected to a vehicle battery as a power supply. A central processing unit is operated responsive to a signal from a pressure variation detecting loop. The pressure variation detecting loop comprises: a filtering loop, a power regulating loop, a pressure sensing loop, a low pass amplifying loop, and positive and negative comparing loops for amplifying the signals and then outputting the signal to the central processing unit. The central processing unit executing preset sound and light alarming step in response to the signal.

3 Claims, 5 Drawing Sheets

VEHICLE BURGLAR ALARM LOCK

FIELD OF THE INVENTION

The present invention relates to a burglar alarm lock, and especially to vehicle burglar alarm lock having a pressure variation detecting loop.

BACKGROUND OF THE INVENTION

In general, to avoid a car to be stolen, locks of steering wheel, gears, brake, etc. or other electronic locks are installed in cars. However, the mechanic locks only delay the time for being stolen even they are very precise and concrete. They can not completely prevent a car from being stolen. The electronic burglar alarms in generally detect the car or window to be opened and then emit sound or light to inform the user or cut the power supply of the car. To present a sufficient effect in burglar-proof, the vibration detecting device is adjusted to be very sensitive. Therefore, it is easily actuated due to outer shocks (for example, thunderbolts, firecrackers, or passing through of a large vehicles, etc.), thereby, inducing a large noise to the people nearby. This will cause a great trouble, especially in the night.

SUMMARY OF THE INVENTION

Accordingly, the primary object of the present invention is to provide a vehicle burglar alarm lock, which improves the prior art defects so as to provide a vehicle burglar alarm lock having the functions of detection and firmly locking. When the present invention is set in a burglar alarm condition, if the burglar opens the door of a car or breaks the window of a car, air pressure in the car will vary. The pressure sensor will detect the pressure variation in the vehicle and trigger the alarming circuit to operate the preset sound and light alarm so as to threat the burglars and inform the owner of the car. A mechanic lock has a body locking to the steering wheel for preventing the car to be stolen.

The various objects and advantages of the present invention will be more readily understood from the following detailed description when read in conjunction with the appended drawing.

DETAILED DESCRIPTION OF THE INVENTION

Figure 1:
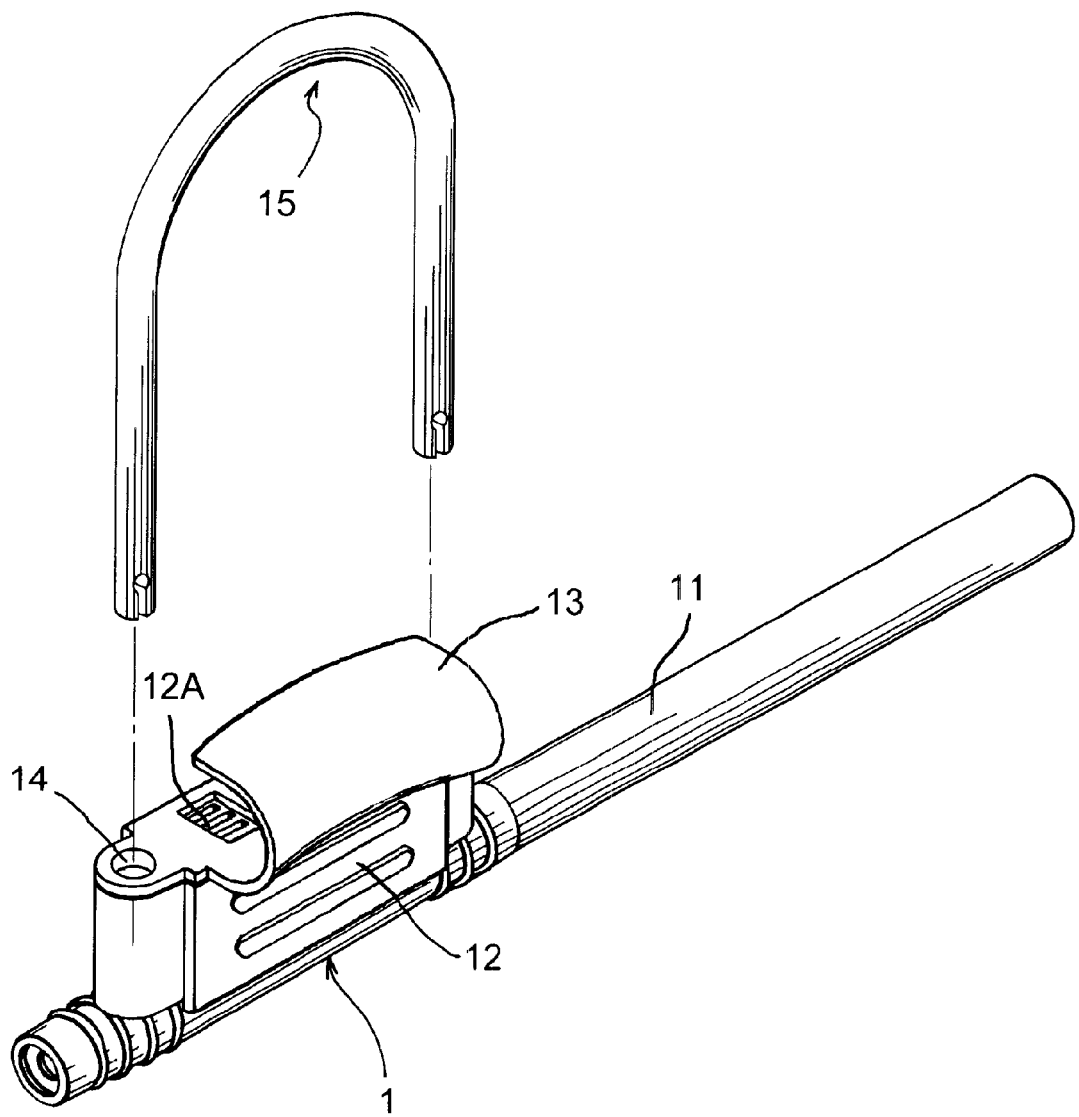
FIG. 1 is a perspective view of the present invention.
Figure 2:
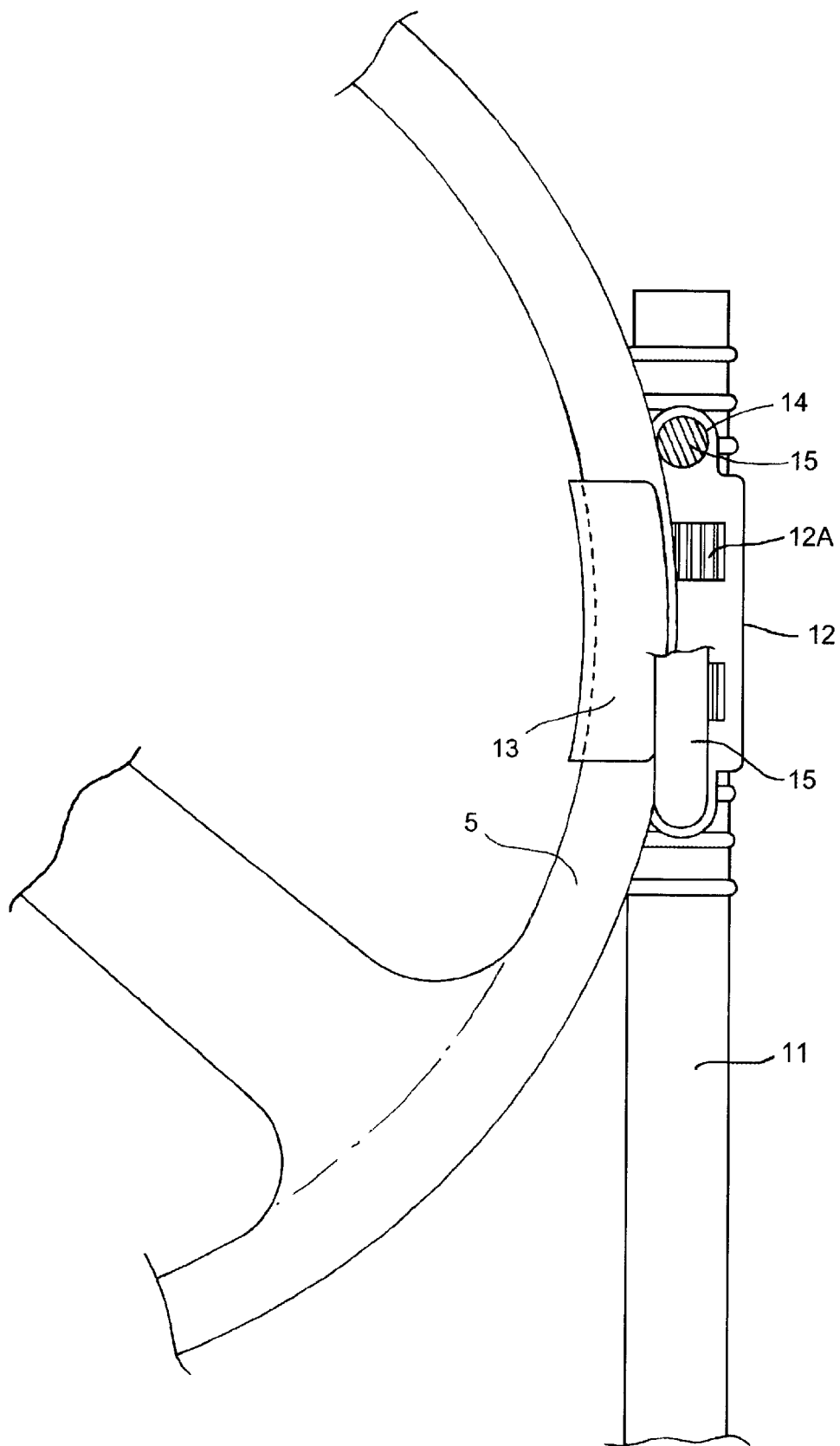
FIG. 2 shows an embodiment of the present invention.

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

As shown in the figures, in the embodiment of the present invention, the vehicle burglar alarm lock of the present invention comprises a burglar alarm lock body 1 to be locked to a steering wheel 1 and an alarm circuit 2 with a pressure detector. The lock body has a structure approximately identical to the prior art steering wheel. Namely, a lock head, lock center, etc. (not shown) are installed in the tube of the long rod 11 of the lock body. A front end of the long rod 11 is installed with a protruded lock seat 12. The circuit element of the alarm circuit 2 can be firmly secured therein. The top surface of the lock seat 12 has a locking portion 13 having a C shape cross section. Two sides of the lock seat 12 each are installed with a stud inserting hole 14 which is exactly matched with the stud 15. In locking, the lock portion 13 is buckled to the annular handle 5 of the steering wheel. Two ends of the stud 15 are inserted into the inserting holes 14. Therefore, the body 1 is locked to the annular handle 5 of the steering wheel. At the same time, the alarming circuit 2 is actuated.

Figure 3:
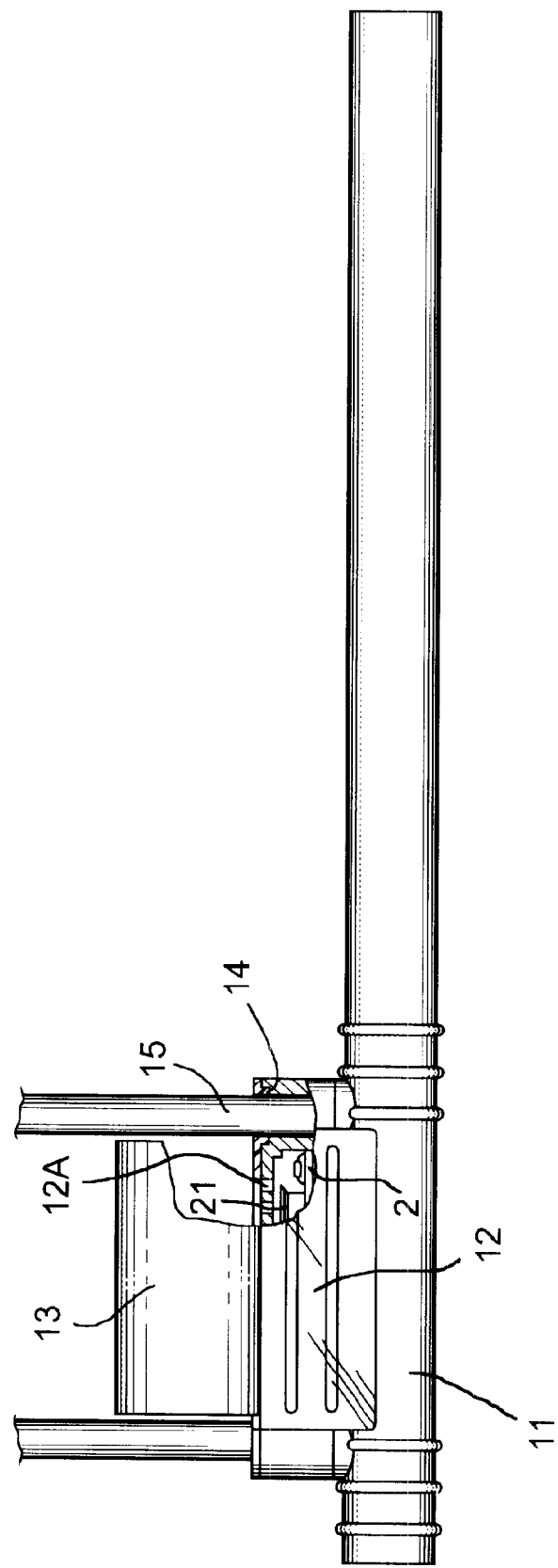
FIG. 3 is a partial plane cross sectional view of the present invention.

Referring to FIG. 3, the mask of the locking seat 12 is installed with a penetrating hole 12A, and the sensing head 21 of the pressure sensor of the alarming circuit 2 is exactly aligned to the hole 12A so that the air within and out of the masking of the lock seat 12 is communicated, and as a result, the sensing head 21 can measure the variation of air pressure in the car.

Figure 4:
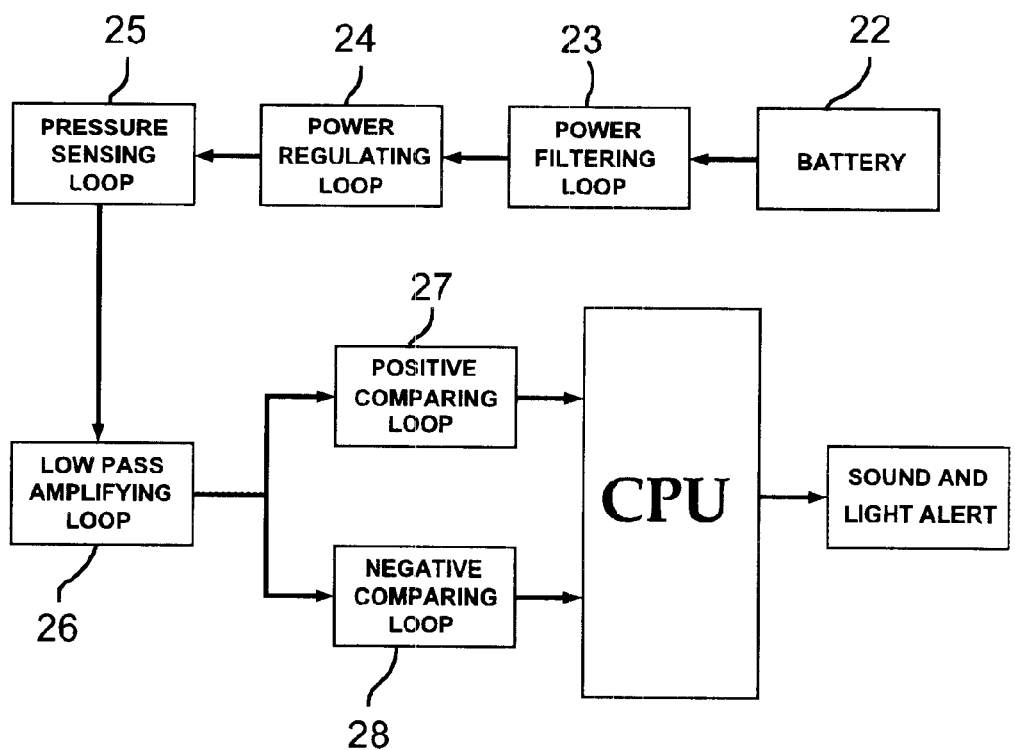
FIG. 4 is a functional block diagram of the alarming circuit in the present invention.
Figure 5:
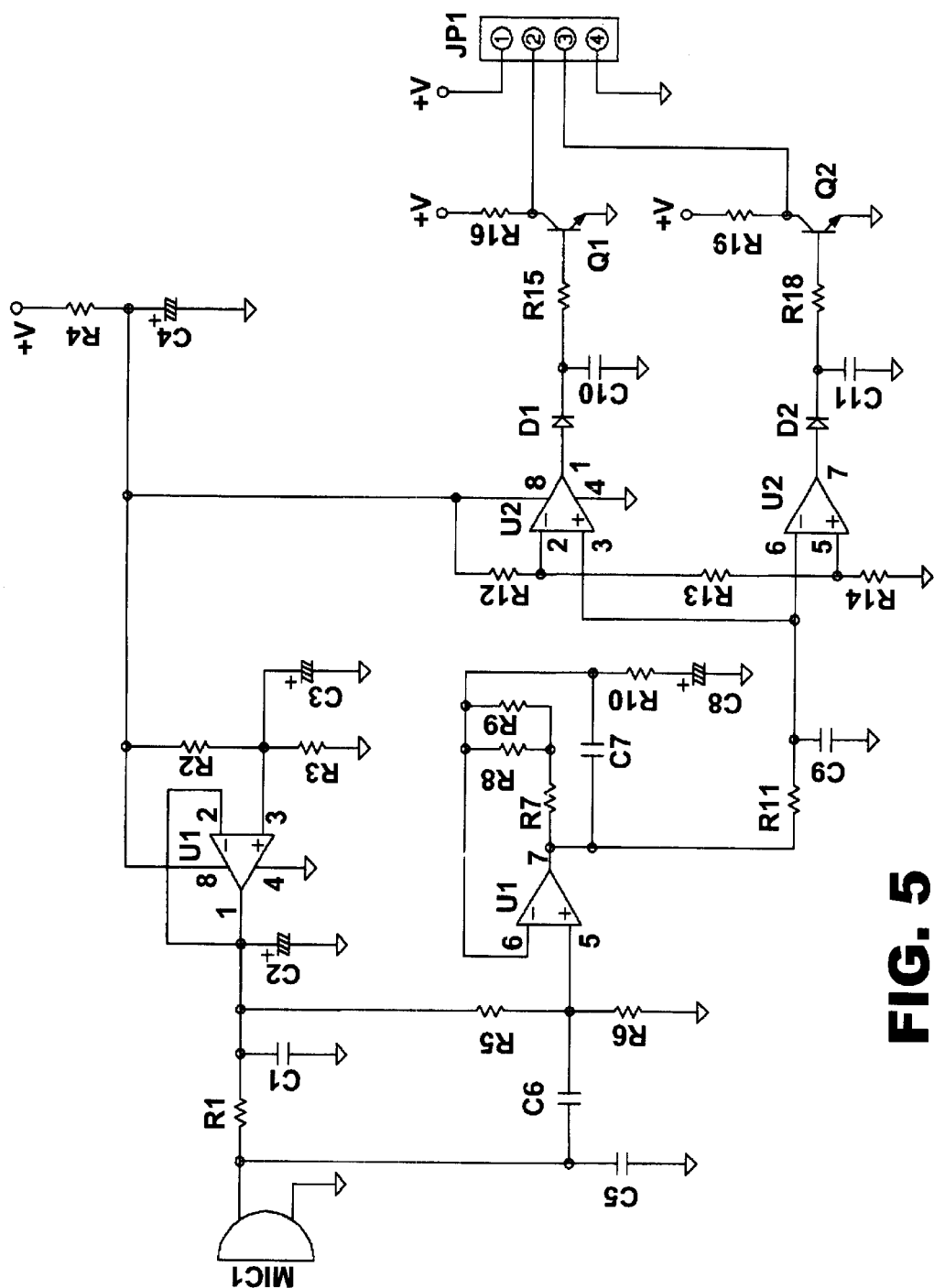
FIG. 5 is a circuit diagram of the alarming circuit in the present invention.

With reference to FIGS. 4 and 5, the alarming circuit 2 has an independent battery set 22 as a power supply. The central processing unit CPU is operated according to the pressure variation detecting loop. When the abnormal signals of burglar alarm are triggered, the alarming circuit 2 will emit a large alarm voice to threat the burglars. The pressure variation detecting loop includes a power filtering loop 23; a power regulating loop 24, a pressure sensing loop 25, a low pass amplifying loop 26, a positive and a negative comparing loop 27 and 28. The operation will be described in the following with the circuit diagram. The power is inputted from one end of the resistor R4 and is filtered by the capacitor C4 to supply to the OP amplifier (OP AMP) U1 loop and the pressure regulating loop of the pressure detector MIC. It is preferably that the pressure detector is a condenser microphone. In the burglar-proof application, when the doors or windows of a car are opened, the air pressure in the air will vary instantly, the pressure detector MIC will convert the pressure variation into electronic signals and transfer the signals through the capacitors C5 and C6 to the OP amplifier OP so as to amplify the signal. Then the signal is transferred to an OP voltage comparator U2 for detecting positive and negative signals. The positive signal is transferred to the transistor Q1 for being amplified through a diode D1, a capacitor C10, and a resistor R15 and then is outputted to the central processing unit CPU. The negative signal is transferred to the transistor Q2 for being amplifying through a diode D2, a capacitor C11, and a resistor R 18 and then is outputted to the central processing unit CPU. Finally, the preset sound and light alarming signal is performed by the central processing unit CPU according to these signals.

In summary, when the present invention is set in a burglar alarm condition, if the burglar opens the door of a car or breaks the window of a car, air pressure in the car will vary. The pressure sensor 25 will trigger the alarming circuit 2 to operate the preset sound and light alarm so as to threat the burglar and inform the owner of the car. A mechanic lock has a body 1 locking to the steering wheel for preventing the car to be stolen.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A vehicle burglar alarm lock having a body capable of being locked to an annular handle of a steering wheel, an alarming circuit in the body capable of being actuated for operation; characterized in that: the alarming circuit has an independent battery set not being connected to a vehicle battery so as to be utilized as a power supply;

a central processing unit is operated responsive to a signal from a pressure variation detecting loop; the pressure variation detecting loop comprises:

a filtering loop connected to an input end of a power supply;

a power regulating loop connected to the filtering loop;

a pressure sensing loop connected to the power regulating loop and having a pressure variation detecting loop for converting environmental air pressure variation into electronic signal and then the signal being outputted through a capacitor set;

a low pass amplifying loop for receiving the signal from the pressure sensing loop and then sending the signal out through resistors and capacitors; and a positive comparing loop and a negative comparing loop for detecting positive and negative signals, respectively and then transferring the positive and negative signals, respectively, through a respective loops formed by diodes, capacitors, resistors and transistors and other elements so as to amplify the signals and then is outputted to the central processing unit; and then the central processing unit executing a sound and light alarming step in response to the signal.

2. The vehicle burglar alarm lock as claimed in claim 1, wherein the body has a mask with a penetrating hole thereon so as to communicate air within and out of the mask; and a sensing head of the pressure sensor is exactly aligned to the hole.

3. The vehicle burglar alarm lock as claimed in claim 1, wherein the pressure detector is a condenser microphone.

* * * * *